(12) United States Patent
Koltick et al.

(10) Patent No.: US 7,595,494 B2
(45) Date of Patent: Sep. 29, 2009

(54) DIRECTION-SENSITIVE RADIATION DETECTOR AND RADIATION DETECTION METHOD

(75) Inventors: David S. Koltick, Lafayette, IN (US); Ivan S. Novikov, Lafayette, IN (US); Howard M. Harmless, Indianapolis, IN (US); Aaron B. Copeland, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 11/968,954

(22) Filed: Jan. 3, 2008

(65) Prior Publication Data
US 2008/0173821 A1 Jul. 24, 2008

Related U.S. Application Data

(60) Provisional application No. 60/883,259, filed on Jan. 3, 2007.

(51) Int. Cl.
*G01T 1/169* (2006.01)
(52) U.S. Cl. .................................................. 250/394
(58) Field of Classification Search ................... 250/394
See application file for complete search history.

(56) References Cited

U.S. PATENT DOCUMENTS

| | | | | |
|---|---|---|---|---|
| 3,140,395 A | * | 7/1964 | Scherbatskoy | 250/366 |
| 5,783,829 A | * | 7/1998 | Sealock et al. | 250/367 |
| 6,486,468 B1 | * | 11/2002 | Lacy | 250/282 |
| 7,339,172 B2 | * | 3/2008 | Rowland et al. | 250/363.02 |

\* cited by examiner

*Primary Examiner*—Constantine Hannaher
(74) *Attorney, Agent, or Firm*—Hartman & Hartman, P.C.; Gary M. Hartman; Domenica N.S. Hartman

(57) ABSTRACT

A radiation detection system and method suitable for use by a first responder to detect a radiological source. The system includes a container that encloses a chamber containing a pressurized inert gas. Incident gamma rays pass through walls of the container to interact with inert gas atoms within the chamber. Wavelength-shifting fiber elements are disposed within scintillator bars oriented parallel to and radially spaced from the chamber axis. At least one sensor is interconnected with the fiber elements to receive first signals therefrom in response to the scattered gamma rays. An electrically-charged wire is disposed within the container along the axis thereof. The wire is adapted to attract electrons released from atoms of the inert gas that are ionized from being impacted by an incident gamma ray, and then produce second signals in response to the released electrons. Electronic circuitry collects the first and second signals, and a processor acquires and analyzes the first and second signals to produce an output based thereon.

20 Claims, 4 Drawing Sheets

DIRECTION-SENSITIVE RADIATION DETECTOR AND RADIATION DETECTION METHOD

CROSS REFERENCE TO RELATED APPLICATIONS

This application claims the benefit of U.S. Provisional Application No. 60/883,259, filed Jan. 3, 2007, the contents of which are incorporated herein by reference.

BACKGROUND OF THE INVENTION

The present invention generally relates to systems and methods for detecting radiation. More particularly, this invention relates to a system and method suitable for use by first responders to quickly detect radiation and locate its source.

The role of a "first responder" is to quickly arrive on the scene of an emergency, accident, natural or human-made disaster, or similar event, tend to the injured, and assess any existing risks. Because of the possibility for harmful radiation levels in such events, there is a need to equip first responders with radiation detectors. However, existing radiation detectors are not well suited for use by first responders due to the inherent intricacies and complex technologies associated with high efficiency detection and identification of gamma rays. For example, sophisticated analysis and identification of radiation sources have conventionally required expensive detectors, elaborate electronics and cooling equipment, and specially trained personnel to ensure proper function and use of the equipment. Consequently, existing radiation detection equipment are generally too heavy and costly for practical use by first responders.

Existing equipment are also not well suited for quickly detecting radiological sources at distances (distance undefined), which is desirable to enable a first responder to "sweep" a building, facility, etc., from the outside or otherwise at a sufficient distance to avoid risks that might arise from entering a confined space with a potential radiological source. Furthermore, existing radiation detection equipment typically provide little if any spatial resolution capability. This shortcoming hinders the ability of a first responder to quickly identify the location of radiological materials, which is a key primary mission of first responders in that the ability to spatially resolve radiological sources is an important step in limiting a population's exposure to a radiological threat. At the same time, a first responder is typically not required to analyze or identify the specific source of radiation in any refined manner. Instead, the first responder's mission is to quickly determine whether harmful radiation levels are present, and if so determine the location of the radiation source. Such a capability is greatly enhanced if the detection equipment were to provide spatial resolution and a simple TRUE/FALSE indication, and did not depend on precision instrumentation often found in radiation detection equipment.

In view of the above, there is an existing need for lowcost radiation detection equipment that is simple to operate, accurate, and direction-sensitive, and as such provides a direction-sensitive radiation detection capability for first responders as well as other situations where there is a desire to quickly determine whether radiation is present and spatially locate its source.

BRIEF SUMMARY OF THE INVENTION

The present invention provides a radiation detection system and method suitable for use by a first responder to detect the presence and location of a radiological source.

The system includes a container that encloses a sealed chamber containing an inert gas at an elevated pressure. The container has a longitudinal axis, and walls through which incident gamma rays are able to pass and enter the chamber before interacting with atoms of the inert gas within the chamber. The container further has a plurality of scintillator bars oriented parallel to and radially spaced from the axis of the container. Wavelength-shifting fiber elements are disposed within the scintillator bars and oriented parallel to the axis. The composition of the fiber elements render them responsive to gamma rays scattered by atoms of the inert gas within the container. At least one sensor is interconnected with the fiber elements to receive first signals therefrom in response to the scattered gamma rays. An electrically-charged wire is disposed within the container along the axis thereof, and is being adapted to attract electrons released from atoms of the inert gas that are ionized from being impacted by an incident gamma ray. The wire produces second signals in response to the released electrons. The system further includes electronic circuitry adapted to collect the first signals of the fiber elements and the second signals of the electrically-charged wire, and a processor to acquire and analyze the first and second signals and produce an output based thereon.

In view of the above, it can be seen that the system utilizes a gas-filled chamber to measure both the energy and arrival time of incident gamma rays that are Compton-scattered and then absorbed. The container can be formed of plastic scintillator bars and the electronic circuitry can be uncomplicated, allowing for a lowcost implementation of a practical radiation detector suitable for use by first responders without the need for specialized training.

The directional sensitivity of the radiation detection system of this invention provides for the capability of spatially resolving radiological sources, and the overall sensitivity of the system provides for the capability of detecting radiological sources at distances (distance undefined). These capabilities enable a first responder to sweep a building, facility, etc., from the outside or exterior to spatially locate a radiological source, and therefore avoid risks that might arise from entering a confined space with a potential radiological source. Use of the system can also be extended to manned and unmanned aircraft for detecting radiological sources on the ground, and therefore finds applications in the military and security forces.

Other objects and advantages of this invention will be better appreciated from the following detailed description.

DETAILED DESCRIPTION OF THE INVENTION

Figure 1:
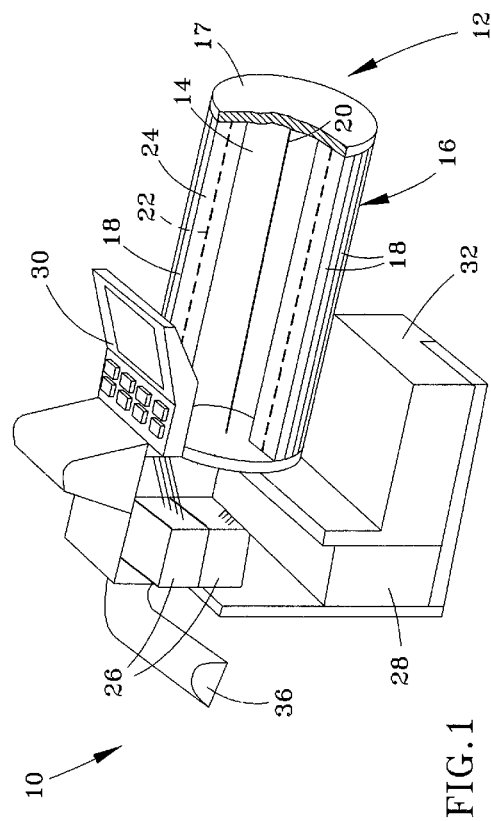
FIG. 1 is a schematic perspective view of a direction-sensitive radiation detector that utilizes a gas-filled chamber enclosed by a scintillator in accordance with an embodiment of this invention.

FIG. 1 represents a radiation detector system 10 within the scope of the invention. The system 10 is preferably sized to be capable of being handheld, and makes use of a Compton camera 12 (shown in partial section along its longitudinal axis in FIG. 1). In the present invention, the camera 12 is represented as comprising a gas-filled chamber 14 enclosed by a tubular-shaped container 16. As known in the art, the operation of a Compton camera is based on the Compton Effect and the phenomenon of Compton scattering, which describes the behavior of photons when they interact with matter. Compton cameras employ a first detector designed to maximize the likelihood of a collision between a photon and matter (Compton scattering), and a second detector designed to absorb the energy remaining after the Compton scatter. The direction of incident gamma rays can be ascertained based on locations of the interactions and the energies detected by the scatterer and absorber. Compton cameras do not require the use of collimators or shielding.

In the present invention, the gas-filled chamber 14 is employed as the photon scatterer and the container 16 is employed as the photon absorber, which together cooperate to measure both the energy and arrival time of a Compton-scattered gamma ray or the absorption of a gamma ray. The chamber 14 is filled with an inert gas at an elevated pressure. The inert gas is preferably xenon or argon at a pressure of about five to about ten atmospheres (about 0.5 to about 1 MPa), more preferably about ten atmospheres (about 1 MPa), though it is within the scope of this invention to use different inert gases at a variety of pressures.

Figure 2:
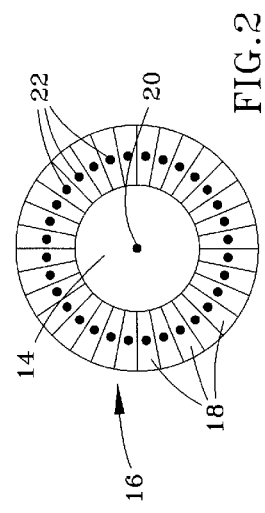
FIG. 2 represents a diametrical cross-section of the chamber and scintillator of FIG. 1.

The container 16 preferably has a high Compton-scattering cross-section due to the high electron density of the high-pressure inert gas. In the embodiment represented in FIGS. 1 and 2, the container 16 comprises a cylindrical outer wall made up of a number of segmented scintillator bars 18 arranged parallel to the axis of the container 16, with the longitudinal ends of the container 16 being closed by end walls 17 to define the gas-tight chamber 14. A wire 20 coupled to a high voltage source is disposed along the axis of the container 16 and serves as an anode to the container 16, which serves as a cathode. A preferred material for the wire 20 is gold-plated tungsten, though it is foreseeable that other materials could be used, such as a stainless steel. With the arrangement shown, any electrons that are released by the impact of a photon with an inert gas atom within the container 16 are attracted to the wire 20 in a direction away from the container 16, thereby generating what will be referred to herein as a chamber signal associated with photon interactions with the inert gas.

Generally speaking, any number of scintillator bars 18 may be used to form the container 16. From a performance standpoint, the number of bars 18 is chosen to attain good light collection, whereas from a practical standpoint it is preferred that the number of bars 18 is chosen to be compatible with a commonly-available multi-anode photomultiplier. For these reasons, a suitable number of bars 18 is believed to be thirty-two. A preferred construction for each bar 18 involves one or more photon-energy absorbing, wavelength-shifting fiber elements 22 embedded in a plastic body 24. Suitable materials for the fiber elements 22 are multi-mode scintillating fibers of the type commercially available under the designation BCF-91A from Saint-Gobain Crystals and under the designation Y7 from Kuraray. Suitable plastic materials for the body 24 include types commercially available under the designation BC-400 from Saint-Gobain Crystals and under the designation SCSN 81 from Kuraray. The bars 18 and end walls 17 may be held together by bonding or with mechanical means (not shown) to form the container 16.

As will become evident from the following discussion, the resulting mixed technology utilizing a noble gas and plastic construction is desirable for minimizing the cost of manufacturing and implementing the radiation detection system 10, while also achieving a directional-sensing capability desired by first responders without the need for specialized training.

In the presence of a radiological source, gamma rays enter the chamber 14 through the bars 18 or "front face" end wall 17 (seen in FIGS. 1 and 3) of the container 16 and interact with the inert gas molecules within the chamber 14. Gamma ray photons are deflected (Compton scatter) and subsequently absorbed by the scintillator bars 18, generating what will be termed herein a scintillator signal, and impacted inert gas atoms are ionized and release electrons that are attracted to the wire (anode) 20, generating a chamber signal. The fiber elements 22 convert the absorbed energy to light of a wavelength which can be detected by a suitable detector. In FIG. 1, the light signals developed in the scintillator bars 18 are transported to one or more miniature light sensors, such as two sixteen-channel multi-anode photomultiplier tubes (PMTs) 26, where the scintillator signals are used to measure both the energy and arrival time of the first or second scattering of gamma rays. The total signal rate observed by the wire 20 of the gas-filled chamber 14 and the fiber elements 22 of the bars 18 is used to determine the radiation source strength, while the combined information in both is used to determine the source direction, preferably within about ten to about fifteen degrees.

In addition to the Compton camera 12 and PMTs 26, FIG. 1 shows the system 10 as further including an interface plate 28 (shown in partial section) to hold the fiber elements 22 to the face of the PMTs 26, a keyboard and directional display unit 30, and an electronic housing 32 that contains electronic circuitry (38 in FIG. 4), at least one processor (40 in FIG. 4), one or more high voltage sources that power the chamber wire 20 and PMTs 26, low voltage sources that power the electronic circuits, and one or more batteries. The system 10 also includes a handle 36 for convenience when holding and using the camera 12. The circuitry 38 preferably contains separate circuits to collect the total charge produced by each scintillator and chamber signal and relative arrival time between the scintillator signals and the chamber signals. The processor 40 acquires and analyzes this electronic information, produces the effective total gamma ray energy in each signal, and places appropriate restrictions on the observed signal patterns before processing them for directional information. The display unit 30 provides the operator with means to control the system 10 and provide a visual readout of the system operation, including directional information regarding the presence and location of a radiological source.

Figure 3:
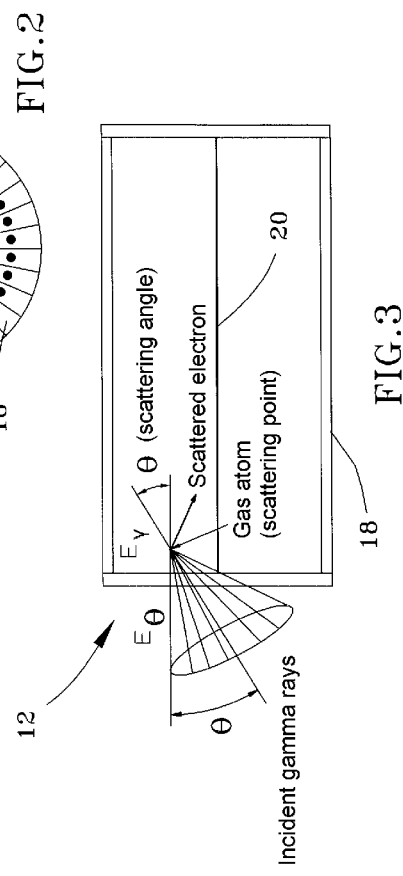
FIG. 3 represents a longitudinal cross-section of the chamber and scintillator of FIG. 1, and identifies nomenclature used to correlate gamma ray energy and scattering angle of a representative photon following a collision with a gas atom within the chamber.

FIG. 3 depicts an occurrence of Compton scattering within the chamber 14, and correlates the gamma ray energy and scattering angle. The direction of the incident gamma ray is within a cone whose axis is along the direction of the scattered gamma ray and whose apex is at the position of the interaction with an atom of inert gas. The gamma ray is first scattered on impact with the inert gas atom to an angle θ and has an energy loss directly correlated to the scattering angle θ by the equation $$f_E = E_{scattered}(\gamma)/E_\gamma = [1 + E_\gamma/m_{electron}c^2(1-\cos(\theta))]^{-1}$$

where $E_\gamma$ is the energy of the incident gamma ray, $E_{scattered}(\gamma)$ is the energy of the scattered gamma ray, $m_{electron}$ is the mass of an electron, and c is the speed of light. The scattered gamma ray is then absorbed in one of the scintillator bars 18, and an electron released from the impacted gas atom causes additional ionization within the gas. The released electrons travel to the chamber wire 20.

Figure 4:
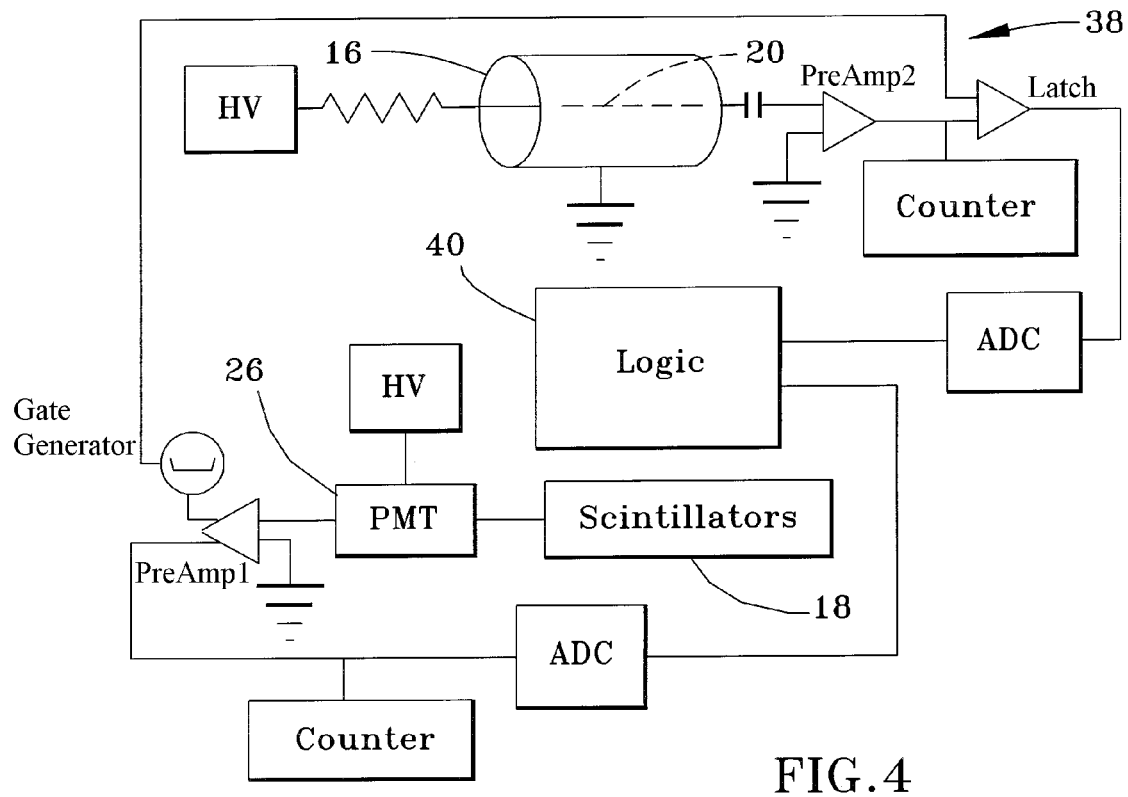
FIG. 4 is a schematic of electronic components of the radiation detector of FIG. 1.

FIG. 4 represents a schematic of electronic circuitry 38 suitable for use with the system 10. Timing and pulse height information received from both the wire 20 and the scintillator bar 18 are collected and stored for further analysis if the following conditions are met: the pulse height in the scintillator bar 18 is above a predetermined threshold set by a pre-amplifier (PreAmp1); the pulse height in the wire 20 is above a predetermined threshold set by a second pre-amplifier (PreAmp2); and the pulse from the wire 20 is observed within a timing gate set by a gate generator and initiated by the scintillator signal. If these conditions are met, the processor 40 collects the information from analog-to-digital converters (ADCs) and performs the calculations in Table 1. The variables in Table I are as follows: $E_\gamma$ is the total energy of an incoming gamma ray; $f_\gamma$ is the fraction of the energy of the gamma ray that is absorbed by a scintillator bar 18; $T_{bar-wire}$ is the electron drift time relative to the clock start time produced by the scintillator bar 18; $E_{wire}$ is the estimated energy the gamma ray deposits in the gas from the pulse produced from the gas chamber 14; $E_{bar}$ is the estimated energy the scattered gamma ray deposits in the scintillator bar 18; $\Sigma_{(left-right)}$ is the left-right scintillator bar asymmetry; $\Sigma_{(up-down)}$ is the up-down scintillator bar asymmetry; $P_{wire}$ is the pulse observed in the gas chamber corrected to give an estimate of the energy deposited there by the gamma ray; $P_{bar}$ is the pulse observed in the scintillator bar 18 corrected to give an estimate of the energy deposited there by the scattered gamma ray; $t_{wire}$ is the time difference between a start time generated by the scintillator pulse and a stop time generated by the gas chamber pulse; $E_{threshold}$ is a pre-set parameter representing the minimum energy accepted by the system 10 due to a pulse from the gas chamber 14 or a scintillator bar 18; $\langle E_\gamma \rangle$ is the average energy observed as a running value over the last set (e.g., forty) events; $N_{left}$ is the number of times the left half of the scintillator bars 18 have recorded hits; $N_{right}$ is the number of times the right half of the scintillator bars 18 have recorded hits; $N_{up}$ is the number of times the upper half of the scintillator bars 18 have recorded hits; and $N_{down}$ is the number of times the lower half of the scintillator bars 18 have recorded hits.

TABLE I

| Variable Measured | Calculation | Comment |
|---|---|---|
| $E_\gamma$ | $P_{wire} + P_{bar}$ | Scaled pulse heights |
| $f_\gamma$ | $P_{bar}/(P_{wire} + P_{bar})$ | Scaled pulse height ratio |
| $T_{bar-wire}$ | $t_{wire}$ | Electron drift time relative to scintillator start |
| $E_{wire}$ | $> E_{threshold}$ | Scaled pulse height |
| $E_{bar}$ | $> E_{threshold}$ | Scaled pulse height |
| $\Sigma_{(left-right)}$ | $\langle E_\gamma \rangle (N_{left} - N_{right})$ | Left-right scintillator bar asymmetry |
| $\Sigma_{(up-down)}$ | $\langle E_\gamma \rangle (N_{up} - N_{down})$ | Up-down scintillator bar asymmetry |

The energy resolution of the system components is sufficient to eliminate low energy gamma ray events. The combined threshold setting is preferably between about 300 keV and about 500 keV. Once the ADCs are read, the energy ratio between the scintillator and chamber signals is determined. The ratio is preferably approximately 0.5, which when the energy resolution is taken into account corresponds to a true energy ratio of $0.3 < f_E < 0.7$ for the energy ratio between the scattered and incident photon. Because of the energy and angular correlation in Compton scattering, the scattered gamma ray lies in the angular region shown in FIG. 5 as a function of incident energy. As such, angular acceptance of interaction events accepted for analysis lie between the two dotted lines in FIG. 5.

Figure 5:
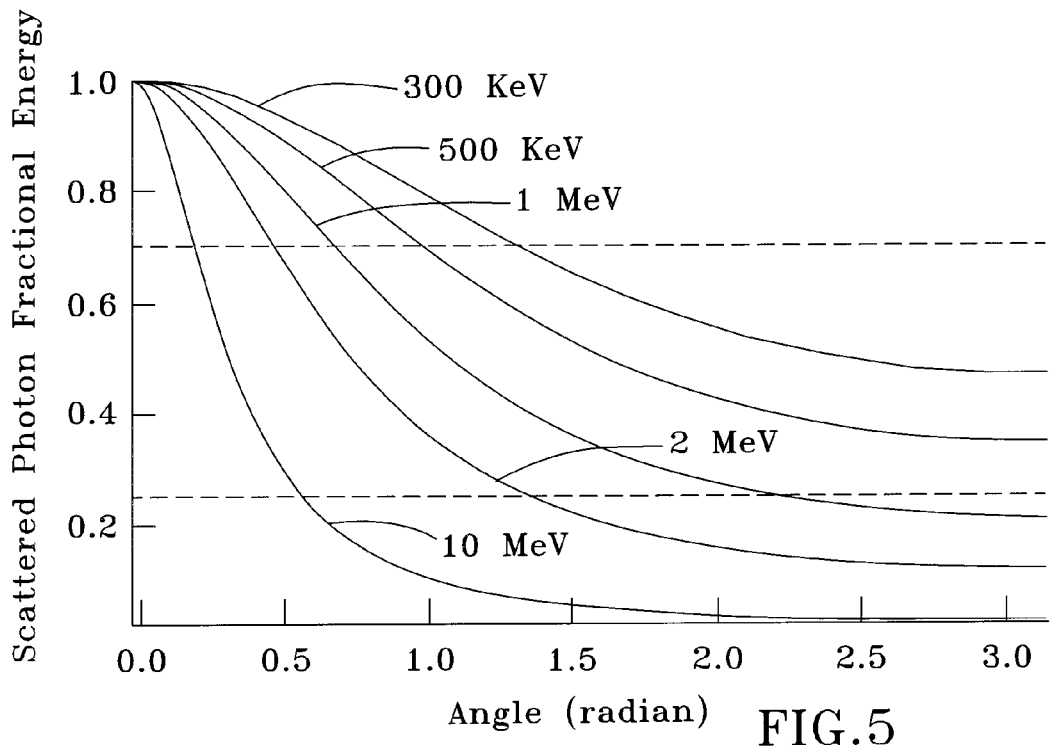
FIG. 5 is a graph indicating the angular acceptance of signals generated by a scattered gamma ray based on the energy ratio of incident and scattered photons sensed by the chamber and the scintillator.
Figure 6:
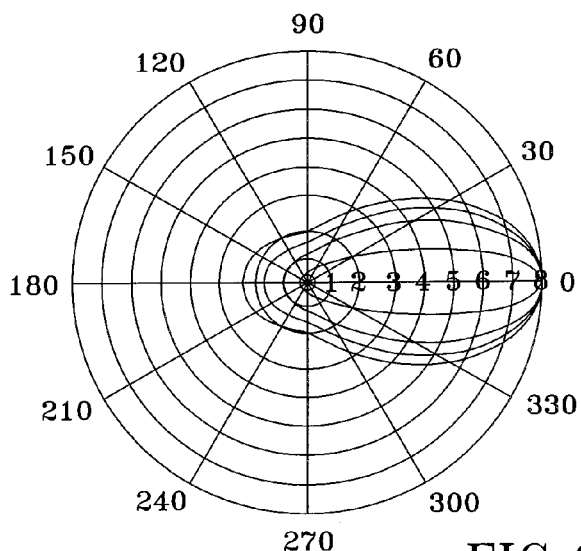
FIG. 6 is a graph representing contours for Compton scattering as a function of energy and angle.

It should be recognized that gamma rays may enter the chamber 14 through the front face wall 17 and the scintillator bars 18 of the Compton camera 12. FIG. 5 represents contours for Compton scattering as a function of energy and angle. Starting with the outer contour and moving inward, the incident gamma ray energy is 0.3, 0.5, 1.0 and 5.0 MeV. A line from the center of the plot to the contour edge gives the relative number of gamma rays scattering into that angular region. In FIG. 5, for gamma rays that enter the front face wall 17 of the camera 12, it can be seen that there is a strong preference for these gamma rays to forward-scatter off the gas atoms into the scintillator bars 18 opposite the source of radiation, as represented in FIG. 3. By averaging over the hit locations of a scintillator bar 18 of between, for example, thirty and forty events, a directional detection sensitivity is obtained notifying the operator to turn the camera 12 in either, or both, a left-right direction and an up-down direction to face the radiation source. As the camera 12 is moved to nearly a face-on orientation with the source, two things occur. The first is that the average energy of the accepted events drops, as can be seen by examining FIGS. 5 and 6. This occurs because the higher energy events scatter forward along the axis of the chamber 14 to the rear of the container 14, which is not equipped with scintillators such that these interaction events are not accepted by the trigger logic. (Note that the overall source strength is measured by the singles rates of the scintillators 18 and wire 20 and is unaffected by the trigger logic used in the directionality measurement.) The second is that the size of the asymmetry measurement made with the scintillator bars 18 is limited to statistical fluctuations, which in the left-right asymmetry is given by:

$$N_{fluctuation} = 2(N_L N_R/(N_L+N_R))^{1/2}$$

and in the up-down asymmetry is given by:

$$N_{fluctuation} = 2(N_U N_D/(N_U+N_D))^{1/2}$$

where $N_L$ is the number of events observed in the left half of the scintillator bars 18, $N_R$ is the number of events observed in the right half of the scintillator bars 18, $N_U$ is the number of events observed in the top half of the scintillator bars 18, and $N_D$ is the number of events observed in the bottom half of the scintillator bars 18.

The asymmetry measurement can be obtained by dividing the $N_{total}$ (thirty-two scintillator bars 18) into two sets of sixteen left-side bars and sixteen right-side bars to assess the left-right asymmetry and, similarly, two sets of sixteen top-side bars and sixteen bottom-side bars for the up-down asymmetry. Based on these considerations, it is expected that the angular resolution of the system 10 when averaged over forty events is $$\delta\theta_{Resolution} = \langle\theta_{scattering}\rangle_{E-1MeV} \langle N_{fluctuation}\rangle / N_{total}) \langle E_{on\text{-}axis}\rangle / \langle E_{off\text{-}axis}\rangle = \text{about } 10°$$

where $\delta\theta_{Resolution}$ is the estimated angular resolution of the system, $\langle\theta_{scattering}\rangle_{E-1MeV}$ is the gamma ray scattering angle for gamma rays of approximately 1 MeV, $N_{total}$ is the total number of events used in the estimate, $\langle E_{on\text{-}axis}\rangle$ is the average gamma ray source energy as measured when the source is on-axis (of the container 14), and $\langle E_{off\text{-}axis}\rangle$ is the average gamma ray source energy as measured when the source is off-axis (of the container 14).

Figure 7A:
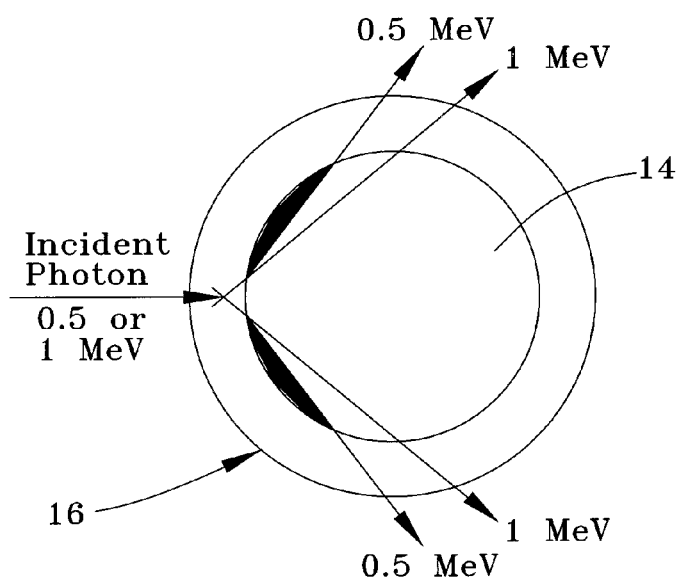
FIGS. 7A and 7B illustrate two situations in which the radiation detector detects gamma rays entering through the sides (scintillator) of the detector.
Figure 7B:
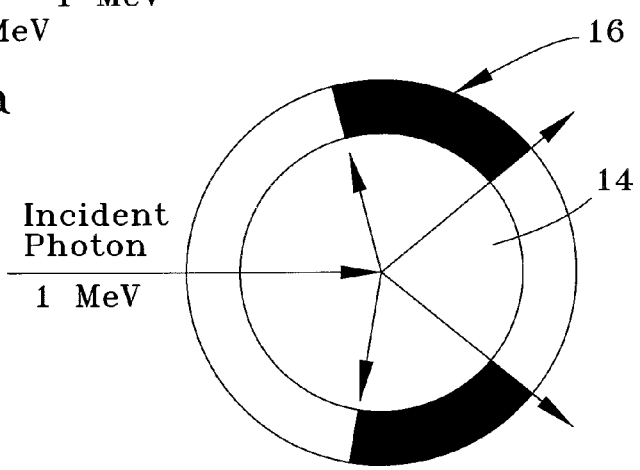

While the above discussion indicates excellent spatial resolution for gamma rays that enter the front face wall 17 of the detector system, an operator is not likely to initially orient the camera 12 in nearly the correct direction of a radiation source. For this reason, gamma rays that enter the chamber 14 through the sides of the camera 12 (i.e., via the scintillator bars 18) must also be considered. There are two classes of events that can trigger the system 10 when gamma rays enter from the sides. In the first event class shown in FIG. 7A, a gamma ray first excites a scintillator bar 18, followed by interaction with a gas atom. FIG. 7A depicts the maximum forward scattering angles allowed by the trigger for two different energies, 0.5 MeV and 1 MeV. Because of the energy ratio requirement found using the ADC information, the scattered gamma ray can't scatter at a more forward angle than the angle of the lines shown in FIG. 7A and be accepted into the calculation. In this case, the acceptance is limited and can be further restricted if these events, having long drift times, are disallowed by the timing gate. FIG. 7B represents the second event class, in which a gamma ray first interacts with a gas atom and then interacts with a scintillator bar 18. Minimum and maximum scattering angles are shown for the gamma ray. This type of event has a more uniform timing distribution and, as shown in FIG. 7B, preferentially excites scintillator bars 18 on the opposite side of the container 16 to the gamma ray entry point. When both these classes of events are combined in the running average, a strong signal is produced to notify the user that the camera 12 must be turned in a direction toward the source of radiation.

Figure 8:
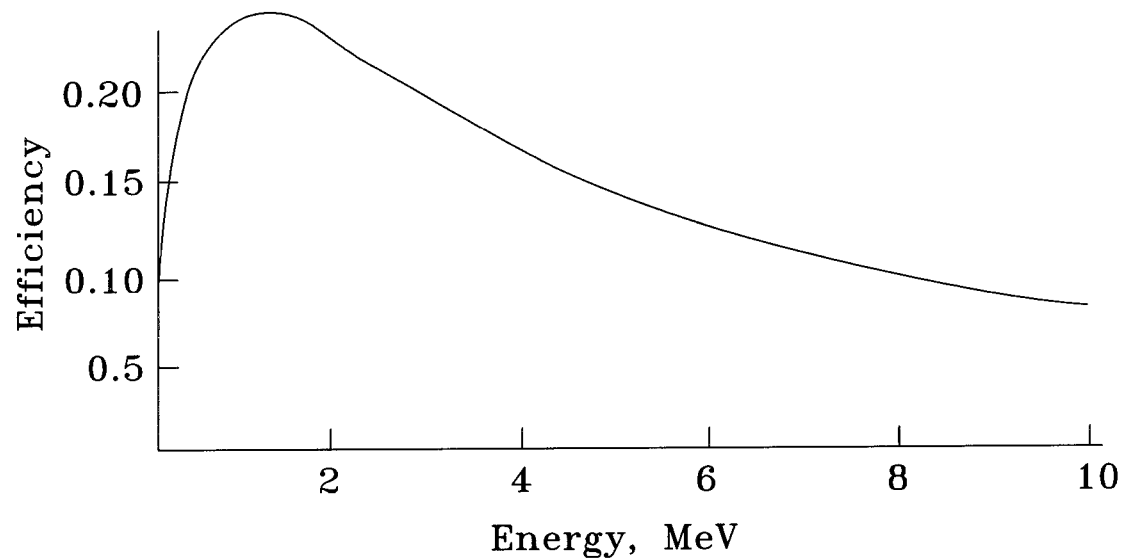
FIG. 8 is a graph plotting the acceptance of the detector to Compton scattering as a function of energy.
Figure 9:
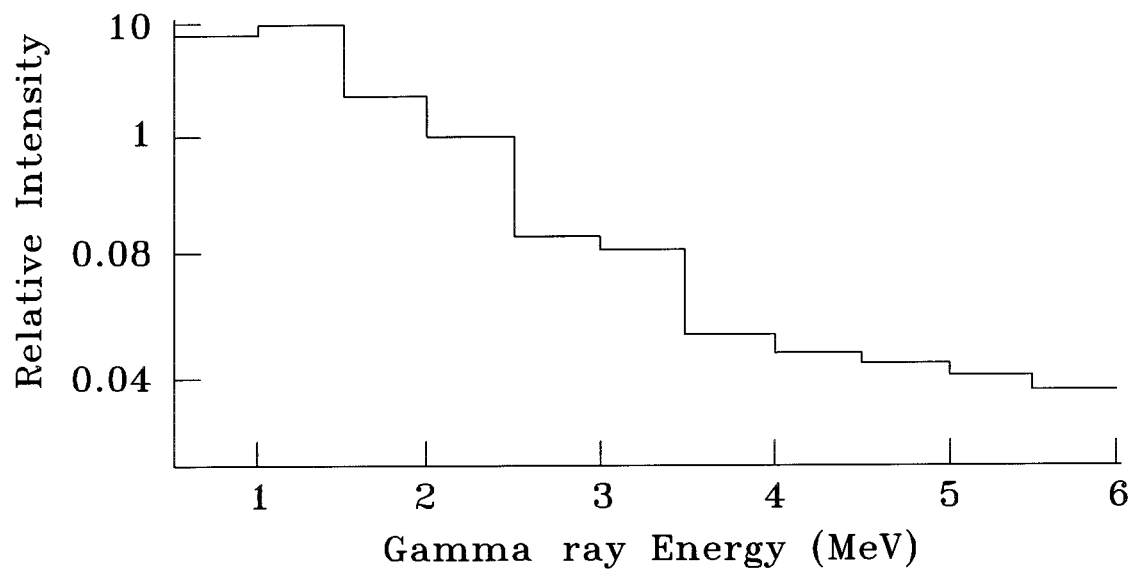
FIG. 9 is a graph plotting the measured energy spectrum of gamma rays from a Cf-252 source.

In order to achieve rapid results, it is important that the detector system 10 have good acceptance for both the scattered and absorbed gamma rays. To accomplish this, a suitable length and diameter for the chamber 14 when filled with xenon gas at a pressure of about five to ten atmospheres (about 0.5 to about 1 MPa) is about 40 cm and about 10 cm, respectively, and the scintillator bars 18 may have a radial thickness of about 2.5 cm. With these conditions, the probability of a 1 MeV gamma ray traveling along the axis of the chamber 14 to Compton scatter is about 60% (calculated from the Klein-Nishina formula). FIG. 8 shows the estimated acceptance of the system 10 with the foregoing dimensions for Compton events of gamma rays directed along the axis of the chamber 14 as a function of energy. As shown, the efficiency of the system 10 peaks at approximately 20% for 1 MeV gamma rays. The efficiency curve is well matched to locate radiation sources, as 1 MeV is a typical gamma ray energy emitted by radioactive sources. For comparison, the energy spectrum for gamma radiation from a Californium-252 source is shown in FIG. 9. The plotted energy spectrum in FIG. 9 is also typical of uranium.

While the invention has been described in terms of a specific embodiment, it is apparent that other forms could be adopted by one skilled in the art. For example, the physical configuration of the system 10 could differ from that shown, and materials and processes other than those noted could be used. Therefore, the scope of the invention is to be limited only by the following claims.

The invention claimed is:

1. A radiation detection system comprising:
    a container enclosing a sealed chamber containing an inert gas at an elevated pressure, the container having a longitudinal axis, walls through which incident gamma rays are able to pass and enter the chamber before interacting with atoms of the inert gas within the chamber, and a plurality of scintillator bars oriented parallel to the axis and radially spaced from the axis;
    wavelength-shifting fiber elements disposed within the scintillator bars, oriented parallel to the axis, and responsive to gamma rays that are scattered by atoms of the inert gas;
    at least one sensor interconnected with the fiber elements to receive first signals therefrom in response to the scattered gamma rays;
    an electrically-charged wire along the axis of the container, the wire being adapted to attract electrons released from atoms of the inert gas that are ionized from being impacted by an incident gamma ray, the wire producing second signals in response to the released electrons;
    electronic circuitry adapted to collect the first signals of the fiber elements and the second signals of the electrically-charged wire; and
    a processor adapted to acquire and analyze the first and second signals and produce an output based thereon.

2. The radiation detection system according to claim 1, wherein the output of the processor provides a directional-sensing capability to the radiation detection system.

3. The radiation detection system according to claim 2, wherein the output of the processor is based on the pulse heights and relative timing of the first and second signals to indicate the relative orientation of the chamber to a radiological source of the incident gamma rays.

4. The radiation detection system according to claim 1, wherein the processor does not process any of the first and second signals corresponding to the incident gamma rays whose energy levels are less than 300 keV.

5. The radiation detection system according to claim 1, wherein the processor does not process the first and second signals corresponding to the incident gamma rays whose scattered-to-incident energy ratios are less than 0.3 and greater than 0.7.

6. The radiation detection system according to claim 1, wherein the fiber elements are responsive to the incident gamma rays that pass through the scintillator bars prior to entering the chamber and also the incident gamma rays that do not pass through the scintillator bars prior to entering the chamber.

7. The radiation detection system according to claim 1, wherein the at least one sensor comprises at least one multi-anode photomultiplier tube.

8. The radiation detection system according to claim 1, wherein the inert gas is xenon or argon.

9. The radiation detection system according to claim 1, wherein the fiber elements are wave-shifting multi-mode scintillating fibers.

10. The radiation detection system according to claim 1, wherein the walls of the container comprise a cylindrical wall comprising the scintillator bars.

11. The radiation detection system according to claim 1, wherein the scintillator bars comprise plastic bodies in which the fiber elements are embedded.

12. The radiation detection system according to claim 1, wherein the electrically-charged wire is a gold-plated tungsten wire.

13. The radiation detection system according to claim 1, further comprising means for displaying the output of the processor.

14. The radiation detection system according to claim 13, wherein the displaying means indicates the relative orientation of the chamber to a radiological source of the incident gamma rays.

15. A radiation detection method comprising:
operating a radiation detection system comprising a container enclosing a sealed chamber containing an inert gas at an elevated pressure, the container having a longitudinal axis, walls through which incident gamma rays are able to pass and enter the chamber before interacting with atoms of the inert gas within the chamber, a plurality of scintillator bars radially spaced from the axis, wavelength-shifting fiber elements disposed within the scintillator bars and responsive to gamma rays that are scattered by atoms of the inert gas, and an electrically-charged wire along the axis of the container and adapted to attract electrons released from atoms of the inert gas that are ionized from being impacted by an incident gamma ray; and
outputting directional information regarding a radiological source of the incident gamma rays by processing and analyzing first signals generated by the wire in response to the electrons released from the atoms of the inert gas and processing and analyzing second signals generated by the fiber elements in response to the scattered gamma rays.

16. The radiation detection method according to claim 15, wherein the directional information is based on pulse heights and relative timing of the first and second signals to indicate the relative orientation of the chamber to the radiological source of the incident gamma rays.

17. The radiation detection method according to claim 15, wherein the first and second signals corresponding to the incident gamma rays whose energy levels are less than 300 keV are not processed and analyzed.

18. The radiation detection method according to claim 15, wherein the first and second signals corresponding to the incident gamma rays whose scattered-to-incident energy ratios are less than 0.3 and greater than 0.7 are not processed and analyzed.

19. The radiation detection method according to claim 15, wherein the fiber elements are responsive to the incident gamma rays that pass through the scintillator bars prior to entering the chamber and also the incident gamma rays that do not pass through the scintillator bars prior to entering the chamber.

20. The radiation detection method according to claim 15, wherein the radiation detection system is operated to sweep a facility from an exterior thereof to spatially locate the radiological source within the facility.

* * * * *